T

United States Patent
Matteucci et al.

(10) Patent No.: US 9,126,153 B2
(45) Date of Patent: Sep. 8, 2015

(54) SELECTIVE GAS TRANSPORT FILMS THAT CONTAIN BROMINATED STYRENE-BUTADIENE COPOLYMERS

(75) Inventors: Scott T. Matteucci, Midland, MI (US); Mark W. Beach, Midland, MI (US); Michal E. Matteucci, Midland, MI (US); Shari L. Kram, Midland, MI (US); William G. Stobby, Midland, MI (US); Ted A. Morgan, Midland, MI (US); Inken Beulich, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/126,836

(22) PCT Filed: Jun. 27, 2012

(86) PCT No.: PCT/US2012/044294
§ 371 (c)(1),
(2), (4) Date: Dec. 16, 2013

(87) PCT Pub. No.: WO2013/009468
PCT Pub. Date: Jan. 17, 2013

(65) Prior Publication Data
US 2014/0116248 A1    May 1, 2014

Related U.S. Application Data

(60) Provisional application No. 61/507,633, filed on Jul. 14, 2011.

(51) Int. Cl.
| | |
|---|---|
| *B01D 71/44* | (2006.01) |
| *B01D 53/22* | (2006.01) |
| *B01D 71/82* | (2006.01) |
| *C08J 5/18* | (2006.01) |
| *C10L 3/10* | (2006.01) |
| *E04B 1/62* | (2006.01) |
| *B01D 71/26* | (2006.01) |
| *B01D 71/28* | (2006.01) |

(52) U.S. Cl.
CPC ............... *B01D 71/44* (2013.01); *B01D 53/22* (2013.01); *B01D 53/228* (2013.01); *B01D 71/82* (2013.01); *C08J 5/18* (2013.01); *C10L 3/104* (2013.01); *E04B 1/625* (2013.01); *B01D 71/26* (2013.01); *B01D 71/28* (2013.01); *B01D 2256/24* (2013.01); *B01D 2257/304* (2013.01); *B01D 2257/306* (2013.01); *B01D 2257/504* (2013.01); *C08J 2309/06* (2013.01); *C10L 2290/548* (2013.01); *Y02C 10/10* (2013.01); *Y10T 428/249953* (2015.04)

(58) Field of Classification Search
CPC ...... B01D 53/22; B01D 53/228; B01D 71/26; B01D 71/28; B01D 71/44; B01D 71/82; B01D 2256/24; B01D 2256/245; B01D 2257/304; B01D 2257/306; B01D 2257/504; B01D 2257/80; C08J 5/18; C08J 2309/06; C10L 3/104; C10L 2290/548; Y02C 10/10
USPC ................. 96/4, 11, 13, 14; 95/45, 49, 51, 52
See application file for complete search history.

(56) References Cited

U.S. PATENT DOCUMENTS

| | | | |
|---|---|---|---|
| 3,576,912 A | 4/1971 | Winkler | |
| 4,575,385 A * | 3/1986 | Brooks et al. | 96/13 |
| 4,868,222 A | 9/1989 | Chau | |
| 5,106,677 A * | 4/1992 | Yeh et al. | 428/220 |
| 5,509,715 A * | 4/1996 | Scharpf | 52/408 |
| 6,179,523 B1 * | 1/2001 | Langner et al. | 405/169 |
| 6,214,936 B1 * | 4/2001 | Mehler et al. | 525/89 |
| 6,379,796 B1 * | 4/2002 | Uenishi et al. | 428/398 |
| 7,247,191 B2 | 7/2007 | Koros | |
| 7,297,394 B2 | 11/2007 | Khemani | |
| 7,368,511 B2 | 5/2008 | Hale | |
| 7,410,525 B1 | 8/2008 | Liu | |
| 7,422,623 B2 | 9/2008 | Ekiner | |
| 7,851,558 B2 | 12/2010 | King | |
| 2003/0106680 A1 * | 6/2003 | Serpico et al. | 165/166 |
| 2008/0287559 A1 * | 11/2008 | King et al. | 521/56 |

FOREIGN PATENT DOCUMENTS

| | | |
|---|---|---|
| EP | 968758 A | 1/2001 |
| WO | 2007/058736 A | 5/2007 |

OTHER PUBLICATIONS

Csernica, J. et al., "Modification of Polystyrene/Polybutadiene Block Copolymer Films by Chemical Reaction with Bromine and Effect on Gas Permeability", Macromolecules, 1991, 24, pp. 3612-3617.*
Csernica et al., "Gas Permeability of a Polystyrene-Polybutadiene Block Copolymer with Oriented Lamellar Domains", Macromolecules 1987, 20, 2468-2471.
Csernica et al., "Modification of Polystyrene/Polybutadiene Block Copolymer Films by Chemical reaction with Bromine and Effect on Gas Permeability", Macromolecules, 1991,24,2612-3617.

* cited by examiner

*Primary Examiner* — Jason M Greene
(74) *Attorney, Agent, or Firm* — Gary C Cohn PLLC

(57) ABSTRACT

Brominated styrene-butadiene copolymers are useful gas transport films. The gas transport films are made by brominating a starting styrene-butadiene copolymer, and then forming the brominated styrene-butadiene copolymer into a film. The film may contain a blend of the brominated styrene-butadiene copolymer with one or more other polymers. The films have excellent selectivities between certain pairs of gasses, and exhibit high gas transport rates for various gasses such as carbon dioxide and water vapor.

14 Claims, No Drawings

SELECTIVE GAS TRANSPORT FILMS THAT CONTAIN BROMINATED STYRENE-BUTADIENE COPOLYMERS

This application claims priority from U.S. Provisional Patent Application No. 61/507,633, filed 14 Jul. 2011.

The present invention relates to gas transport films that contain brominated styrene-butadiene copolymers.

Polymeric films are commonly used in applications in which permeability to certain gasses or vapors is critical. In almost all of these applications, selectivity of some kind is important, as the polymer film must be able to allow certain specific gasses or vapors to permeate readily, while forming a partial or complete barrier to liquids or other gasses.

In some cases, the film is used to separate gasses. In this case, the film must allow one or more specific components of a gas mixture to permeate through the film more rapidly than other components of the mixture. The rate at which a particular gas can permeate through a polymer film is sometimes expressed as a permeability P, which takes into account the thickness and surface area of the film, as well as the pressure applied across the film. Permeability is often expressed in barrers. One barrer is equal to $10^{-10}$ cm$^3$ of permeated gas (at STP) times the film thickness in cm, divided by the surface area of the film in cm$^2$, the time in seconds and the pressure in cm of mercury (1 barrer=$10^{-10}$ cm$^3$·cm/(cm$^2$·s·cm(Hg)). The ability of a film to discriminate between two gasses in a mixture can be expressed as a separation factor, which is the ratio of the permeabilities of the individual gasses under like conditions. Thus, a film that has a permeability $P_A$=4 (in arbitrary units) for gas A and $P_B$=1 for gas B has a separation factor of 4 for these gases, and will permit four moles of gas A to permeate through the film per mole of gas B that permeates the film. An ideal discriminating film will have a high separation factor for the gases of interest. In addition, the absolute value of the permeability for at least one of the gases should be as high as possible, because high operating rates are needed in most industrial scale processes.

Other applications require a film that allows some or all gases to permeate while maintaining a barrier against liquids. Examples of films of this type are building or house wraps. House wraps are polymeric films that are applied to the exterior of a building construction, under the cladding or fagade. The primary function of these films is to keep water from penetrating from the outside of the building to the frame elements, which are often made of wood or other materials that are susceptible to moisture. However, the house wrap must allow water that does become trapped within the structure to escape, to prevent mold growth or rotting. Therefore, the house wrap must be readily permeable to water vapor.

Foam insulation backing and carpet backing films are other examples of films that must provide a barrier to liquid water while being permeable to water vapor.

Another attribute that is often desired in these separation films is flame retardance, especially when the film is part of a building construction or furnishings. To this end, brominated polymers, including certain brominated styrene-butadiene copolymers, have been evaluated as flame retardant additives, especially for polystyrene foam insulation products. Styrene-butadiene copolymers that have been brominated using certain quaternary ammonium tribromides have been found to be especially useful flame retardant additives for many applications. See e.g., WO 2008/021417 and WO 2008/021418. The quaternary ammonium tribromide bromination process produces a product in which virtually all bromination occurs on the butadiene units of the copolymer. Little or no bromination occurs on the aromatic rings of the polystyrene portion of the copolymer.

Csernica et al., in *Macromolecules* 1991, 24, 3612-3617, evaluated the gas permeation characteristics of certain brominated styrene-butadiene copolymers. These investigators prepared membranes by brominating a previously-formed 0.5 mm sheet of styrene-butadiene copolymer that contained 75% by volume polystyrene. The polybutadiene portion contained mostly 1,4-isomer units. Csernica performed the bromination by immersing the sheet into a solution of bromine in water. This bromination technique is not selective, in that bromination occurs on aromatic rings as well as at the butadiene units. Csernica found that brominating in this manner initially led to reductions in permeability for several gases, but that these reductions were greater for some gases than others, leading to higher separation factors at the cost of reduced flux. As the bromination was continued, Csernica found that permeability began to increase dramatically. Csernica attributed this phenomenon to pore formation at the membrane surfaces. These pores permitted rapid gas transport into the center of the membrane. In essence, the effective thickness of the membrane became smaller as the pores formed, and so gas transport through the membrane became faster. Thus the increases in permeability reported by Csernica are greatly overstated, as they are calculated based on the thickness of the original film, not on that of the much thinner discriminating layer that remains after pores have formed on the film surfaces. As Csernica continued his bromination still further, pore formation ceased and permeabilities once again fell, although not to initial levels. This second reduction in permeability is attributed to bromination of the interior regions of the film, after pores have formed on the film surfaces to allow the liquid brominating agent access to the film center.

In Csernica's experiments, then, high gas transport rates are achieved only by forming pores as a previously-formed styrene-butadiene film is brominated, thereby reducing the effective thickness of the film. In the absence of pore formation, Csernica's work demonstrated that brominating the styrene-butadiene copolymer led to very substantial decreases in permeability. The pore formation that is necessary in Csernica's process to obtain high permeation rates leads to a weakening of the film. Furthermore, Csernica's process for producing the brominated films is not feasible for large-scale production of membranes.

This invention is in one aspect a method for making a gas transport film comprising a brominated styrene-butadiene copolymer, wherein the film is prepared by brominating a starting styrene-butadiene copolymer and then forming the brominated styrene-butadiene copolymer into a film.

The invention in another aspect is a gas transport film comprising a brominated styrene-butadiene copolymer, made in accordance with the foregoing process.

In another aspect, the invention is a gas transport film comprising a brominated styrene-butadiene copolymer, wherein the brominated styrene-butadiene copolymer contains from 40 to 80 mole-% brominated or unbrominated butadiene units.

The invention is also a gas transport film comprising a brominated styrene-butadiene copolymer, wherein more than 50% of the butadiene units in the brominated styrene-butadiene copolymer are 1,2-butadiene units.

The invention is also a gas transport film comprising a brominated styrene-butadiene copolymer, wherein at least 60% of the butadiene units are brominated and no more than 10% of the styrene units are brominated.

Applicants have surprisingly found that, contrary to Csernica, films made from a certain brominated styrene-butadiene copolymers exhibit high permeabilities to certain gases, in particular carbon dioxide and water vapor. Water vapor transmission rates are especially high for many of these films, and so these films are very useful as water vapor transport films for house wrap, carpet backing, packaging and similar applications. These films are also excellent discriminating membranes for many gas pairs, due to large differences in permeation coefficients among various gases. Thus, the films are useful for separating acid gases such as carbon dioxide, hydrogen sulfide and gaseous mercaptans from gaseous alkanes or alkenes (as in natural gas sweetening) for separating oxygen or nitrogen from air, or in other gas separation processes.

Another advantage of the invention is that the brominated styrene-butadiene copolymer has flame retardant properties, as indicated by various standard fire tests, and that membranes containing the brominated styrene-butadiene copolymer also tend to have flame resistance due to the presence of the brominated styrene-butadiene copolymer.

Still another advantage of the invention is that the brominated styrene-butadiene copolymer may be blended with many types of other organic polymers for producing the gas transport film. Accordingly, the gas transport film in certain embodiments comprises a blend of a brominated styrene-butadiene polymer according to one or more of the foregoing aspects of the invention with one or more other organic polymers. In these cases, the brominated styrene-butadiene copolymer often functions as a permeability-enhancing additive that also can impart better fire performance (again, as indicated by various standard fire tests).

Therefore, in certain specific embodiments, the invention is a. A foam thermal insulation product having a gas transport film according to any of the foregoing aspects of the invention attached to at least one surface thereof;

b. A floor covering product having a facing layer and at least one layer of the gas transport film layer of any of the foregoing aspects of the invention attached directly or indirectly to a reverse side of the facing layer.

c. A water-resistive barrier film comprising a gas transport film of any of the foregoing aspects of the invention.

d. A building construction having at least one wall or roof structure having a layer of the gas transport film of any of the foregoing aspects of the invention applied to a major surface thereof; and e. A method for separating gases, comprising contacting a gaseous mixture containing at least one first gas and at least one second gas with a feed side of a membrane comprising the gas transport film of any of the foregoing aspects of the invention and withdrawing a gas enriched in the first gas from a lower pressure downstream side of the membrane.

The brominated styrene-butadiene copolymer is made by brominating a starting styrene-butadiene copolymer. The starting styrene-butadiene copolymer will contain repeating styrene units formed when styrene polymerizes into the polymer chain, and repeating butadiene units formed when butadiene polymerizes into the polymer chain. Butadiene polymerizes to form mainly two types of repeating units. One type, referred to herein as "1,2-butadiene units" takes the form

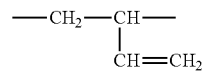

and so introduce pendant unsaturated groups to the polymer. The second main type, referred to herein as "1,4-butadiene" units, takes the form —$CH_2$—CH=CH—$CH_2$— and introduces unsaturation into the main polymer chain. The proportions of 1,2- and 1,4-butadiene units in the starting copolymers may vary widely. In some embodiments, from 50 to 100% of the butadiene units in the starting styrene-butadiene copolymer are 1,4-butadiene units. In other embodiments, at least 50% of the butadiene units in the starting styrene-butadiene copolymer are 1,2-butadiene units. 1,2-butadiene units may constitute at least 60% or at least 70% of the butadiene units in the starting styrene-butadiene copolymer and may be in excess of 85% or even in excess of 90% of the butadiene units in the starting copolymer.

The starting styrene-butadiene copolymer preferably contains at least 15 mole-% butadiene units. It more preferably contains at least 40 mole-% butadiene units and still more preferably contains at least 60 mol-% butadiene units. It may contain as much as 90 mole-% butadiene units, more preferably up to 80 mole-% butadiene units. The starting styrene-butadiene copolymer preferably contains at least 10 mole-%, more preferably at least 20 mole % styrene units, up to 60 mole-%, more preferably up to 50 mole-% styrene units.

The starting styrene-butadiene copolymer may contain repeating units of other copolymerizable monomers. If present, these other repeating units preferably constitute no more than 20 mole % and preferably no more than 10 mole % of the repeating units of the styrene-butadiene copolymer.

The brominated styrene-butadiene copolymer will contain styrene, butadiene and other repeating units in essentially the same proportions as the starting copolymer, with some or all of the butadiene units and optionally some proportion of the styrene or other repeating units being brominated, i.e., having one or more bromine atoms attached thereto. The brominated styrene-butadiene copolymer also will contain 1,2- and 1,4-butadiene units in the same proportions as the starting copolymer, although at least some of those units will be brominated. Unless otherwise specified, the term "butadiene unit" as applied herein with respect to a brominated styrene-butadiene copolymer includes butadiene units which have become brominated (i.e., are substituted with at least one bromine atom) as well as butadiene units which have not become brominated.

The starting styrene-butadiene copolymer may be a random, block or graft copolymer, or some combination of these. Block copolymers are preferred on the basis of cost, performance and ready availability. Such block copolymers contain one or more polystyrene blocks and one or more polybutadiene blocks. Among these, diblock, triblock, star-branched, and multi-block copolymers are especially preferred. Among the useful starting styrene-butadiene block copolymers include those available from Dexco Polymers under the trade designation VECTOR™. A block copolymer preferably contains no more than 10% of randomly polymerized styrene and butadiene.

The starting styrene-butadiene polymer suitably has a weight average molecular weight ($M_w$) of at least 5,000, preferably at least 20,000, more preferably at least 50,000 and still more preferably at least 70,000, up to 400,000, preferably up to 300,000 and more preferably up to 200,000. Molecular weights for purposes of this invention are apparent molecular weights as determined by gel permeation chromatography against a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, or equivalent device, with tetrahydrofuran (THF) or other suitable solvent flowing at a rate of 1 mL/min and heated to a temperature of 35° C. as the eluent.

The molecular weight of the starting styrene-butadiene copolymer (and, correspondingly, that of the brominated copolymer) may in some cases have an effect on the permeability of the film to certain gases, and/or on the separation factor exhibited by the film with certain gas pairs.

The starting styrene-butadiene polymer is brominated by adding bromine across the carbon-carbon unsaturation of at least some of the butadiene units of the polymer. In some embodiments, some or all of the aromatic rings of the styrene units may be brominated, too. The bromination may be performed using a direct bromination process, in which the starting butadiene polymer is brominated with elemental bromine as described, e.g., in WO 2008/021418. An aliphatic alcohol may be present during the bromination reaction, also as described in WO 2008/021418. Residual bromine and other by-products can be removed from the resulting brominated styrene-butadiene copolymer solution, by extraction, washing, or other useful methods.

1,4-butadiene units may be susceptible to chain scission reactions during a direct bromination process. This can lead to a loss of molecular weight that can be undesirable in some cases. Therefore, if a direct bromination process is used, it may be desirable to use as a starting styrene-butadiene one in which greater than 50%, more preferably at least 70% and still more preferably at least 85% of the butadiene units are 1,2-butadiene units, in order to reduce the incidence of chain scission events and resultant loss of molecular weight.

The brominated styrene-butadiene copolymer may be obtained by brominating the starting polymer with a quaternary ammonium tribromide as described, for example, in WO 2008/021417, and/or a quaternary phosphonium tribromide, as described in WO 2010/114637. In such a process, the starting polymer is contacted with the quaternary ammonium tribromide or quaternary phosphonium tribromide, typically in solution in a solvent for the starting copolymer, under conditions such that the starting materials react to produce a solution of the brominated styrene-butadiene polymer and a quaternary ammonium monobromide or quaternary phosphonium monobromide byproduct. The monobromide byproduct can be removed from the brominated copolymer using any convenient method. This process has the advantage of being very selective in that bromination occurs almost entirely at butadiene units, with the near-exclusion of bromination of the aromatic rings of the styrene units. In addition, the process produces very little bromination at tertiary carbon atoms and at allylic carbons, and so produces a brominated copolymer that has excellent thermal stability.

It is also possible to brominate the starting styrene-butadiene copolymer by partially brominating the copolymer using a quaternary ammonium tribromide or quaternary phosphonium tribromide followed by further bromination with elemental bromine, as described in WO 2009/134628.

The extent of bromination can vary considerably. It has been found that gas permeation rates through films of the brominated styrene-butadiene copolymer tend to increase as the proportion of butadiene units that become brominated increases. Separation factors between specific gas pairs also tend to vary with the extent of bromination of the butadiene units. To some extent, therefore, it is preferred to brominate a somewhat high proportion of the butadiene units. At least 60, at least 70, at least 75, at least 80, at least 85 or at least 90% of the butadiene units of the starting polymer may be brominated. Up to 100% of the butadiene units may be brominated. A practical upper limit is generally up to 95%, up to 98% or up to 99%. In particular embodiments, from 60 to 80%, from 70 to 80%, from 70 to 90%, from 80 to 90%, from 80 to 100% or from 90 to 100% of the butadiene units may be brominated.

Some or all of the aromatic rings of the styrene units of the copolymer may be brominated, by which it is meant that at least one bromine atom is introduced to a styrene ring. In some embodiments up to 100% of the styrene units may be brominated. In other embodiments, only a small proportion of the aromatic rings of the styrene units become brominated. The brominated styrene-butadiene copolymer may in some embodiments contain bromine on no more than 10% of the aromatic rings of the styrene units, on no more than 5% of the rings, or on no more than 2% of the rings.

The brominated styrene-butadiene copolymer can be formed into a gas-permeable film using any convenient method. The film may be free-standing (i.e., unsupported), or may form a discriminating layer on a support or other structure. By "film" it is meant any layer of material having a thickness (smallest dimension) of at most about 2.5 mm. The thickness of the film typically will be significantly smaller than that and may be as thin as 10 nanometers if applied as a discriminating layer onto an appropriate support. For example, a film that is supported may have a thickness of from 10 nanometers to 500 microns or from 10 nanometers to 5 microns. Free-standing gas-permeable films typically will have thicknesses of from 10 nanometers to 1 mm, especially from 0.025 to 0.5 mm.

The gas-permeable film should be impermeable to liquids, and therefore should be devoid of pores or other openings that allow liquids to permeate through the film or allow the bulk transport of gasses through the film.

One useful method for producing gas transport films of the invention is a solution casting process, in which the film is cast from a solution of the brominated styrene-butadiene copolymer. This method is particularly suitable for making many types of supported films, including types in which the film is applied onto a substrate to form a discriminating layer. The solution casting method is also especially useful when the gas transport film is a blend of the brominated styrene-butadiene copolymer with certain other polymers, such as thermosets, or thermoplastics that require very high processing temperatures. The solvent can be any solvent for the brominated styrene-butadiene copolymer and, in the case of a blend, a solvent for the other polymer and/or precursor(s) to such other polymer. Suitable solvents include ethers such as tetrahydrofuran; halogenated alkanes such as carbon tetrachloride, chloroform, dichloromethane, bromochloromethane and 1,2-dichloroethane; hydrocarbons such as cyclohexane, cyclopentane, cyclooctane and toluene; halogenated aromatic compounds such as bromobenzene, chlorobenzene and dichlorobenzene; and esters such as n-butyl acetate/ethyl acetate, and the like.

In a solution casting method, the brominated styrene-butadiene copolymer is dissolved in the solvent and the resulting solution is applied to some substrate. The solvent is then removed, typically by evaporation, to produce the gas transport film. The evaporation step may be performed at elevated temperature and/or under subatmospheric pressure, but the solvent should not be brought to a boil to avoid forming defects in the film. In some cases, the dried film is removed from the substrate so as to produce a free-standing film. In other cases, the film remains on the substrate, which functions as a support.

Another useful method for producing gas transport films of the invention is a melt-processing method, in which the brominated styrene-butadiene copolymer is heat-plasticized by heating it above its glass transition temperature and formed into a film. Melt-processing methods for producing gas-permeable films include, for example, various well-known extrusion and film-blowing methods. The film may be oriented monoaxially or biaxially if desired. Melt-processing methods are especially suitable for producing free-standing films and for large-scale film production. Melt-extrusion methods also can be used to form multilayer coextruded gas transport films, in which one or more of the layers is a gas transport layer containing a brominated styrene-butadiene copolymer in accordance with the invention.

Gas transport films also can be produced by spinning fine fibers (such as fibers 0.1 to 5 micrometer in diameter) containing the brominated styrene-butadiene copolymer, and bonding the fibers together, typically by application of heat and pressure, to form a solid sheet.

Still another useful method for producing certain gas transport films of the invention is to form a mixture of the brominated styrene-butadiene polymer with one or more precursors to a second polymer, forming the mixture into a layer, and curing the precursor(s) in the presence of the brominated styrene-butadiene copolymer to form the film. This method is particularly suitable for forming gas transport films that include blends of the brominated styrene-butadiene copolymer with a thermosetting polymer.

When the gas transport film contains a blend of the brominated styrene-butadiene copolymer with one or more other polymers, the brominated styrene-butadiene polymer is most typically present in the blend as a modifier that increases gas transport rates, imparts fire resistance, or both. A blend may contain enough of the brominated styrene-butadiene polymer to provide the blend with a bromine content within a range of from 0.1 percent by weight to 25 percent by weight, based upon blend weight. The bromine content in the blend (provided by the brominated styrene-butadiene copolymer) may be from 0.25 to 10 percent by weight, from 0.5 to 5 weight percent, or from 1 to 3 weight percent. The amount of brominated styrene-butadiene polymer that is needed to provide a given bromine content to the blend will of course depend on its bromine content. In general, however, as little as about 0.15 parts by weight of the brominated styrene-butadiene polymer can be provided per 100 parts by weight of the other polymer (0.15 pphr). At least 0.4 pphr or at least 0.8 pphr of the brominated styrene-butadiene polymer can be provided. Up to 100 pphr or more of the brominated styrene-butadiene polymer can be present in the blend, but a more preferred maximum amount is 50 pphr, a more preferred maximum amount is 20 pphr and a still more preferred maximum amount is 10 pphr or even 7.5 pphr.

A wide variety of polymers can be blended with the brominated styrene-butadiene polymer. Among these are:

a. Polyolefins. These include homopolymers and copolymers of ethylene, such as low density polyethylene (LDPE), high density polyethylene (HDPE), linear low density polyethylene (LLDPE), substantially linear polyethylene homopolymers and copolymers, polypropylene, copolymers of propylene and ethylene, thermoplastic olefins (TPOs), and the like.

b. Poly(vinylaromatic) polymers and copolymers. These include polymers and copolymers of styrene, substituted styrene monomers such as α-methyl styrene, bromostyrene, chlorostyrene and the like; vinyl naphthalene, and the like. Among the copolymers of styrene include styrene-acrylonitrile copolymers, styrene-acrylic acid copolymers, styrene-maleic anhydride copolymers, styrene-ethylene copolymers, styrene-butadiene copolymers, styrene-vinylbenzylchloride copolymers, high impact polystyrene (HIPS), acrylonitrile-butadiene-styrene (ABS) copolymers, and the like.

c. Polyesters, such as poly(ethylene terephlatate) and copolyesters of ethylene terephthalate; polymers and copolymers of cyclic lactones such as polycaprolactone; polybutylenesuccinate and copolymers of butylene succinate; polymers and copolymers of hydroxy acids such as lactic acid, glycolic acid; and the like.

d. Polyamides.

e. Polycarbonates.

f. Polyetheretherketones (PEEK).

g. Fluoropolymers such as polymers and copolymers of tetrafluoroethylene and/or vinylidene fluoride.

h. Polymers and copolymers of vinyl chloride and/or vinylidene chloride.

i. Polysulfones, polyether sulfones.

j. Polymers and copolymers of conjugated dienes such as butadiene and isoprene.

k. Polymers and copolymers of acrylic and/or methacrylic esters, such as polymers and copolymers of one or more of methyl acrylate, ethyl acrylate, n-butyl acrylate, t-butyl acrylate, 2-ethylhexylacrylate, hydroxyethylacrylate, methyl methacrylate, ethyl methacrylate, n-butyl methacrylate, t-butyl methacrylate, 2-ethylhexyl methacrylate, hydroxyethyl methacrylate and the like. Copolymers of any one or more of these acrylate monomers with one or more other copolymerizable monomers such as styrene or ethylene are also useful.

l. Polymers and copolymers of acrylamide.

m. Cellulose ethers and esters, such as hydroxyethyl cellulose, hydroxypropyl cellulose, methylcellulose, methyl hydroxypropyl cellulose, and the like.

n. Polymers and copolymers of vinyl alcohol.

o. Cured epoxy resins.

p. Cured vinyl ester resins.

q. Polyimides.

r. Polyethers and polysulfides.

s. Poly(arylene oxides) such as poly(phenylene oxide) and poly(xylene oxide).

t. Polypyrrolones.

u. Poly(vinyl esters) such as poly(vinyl acetate) and poly(vinylpropionate).

v. Poly(vinyl alcohol).

w. Poly(vinyl aldehydes), poly(vinyl ketones), poly(vinyl amides), poly(vinylamines), poly(vinyl urethanes), poly(vinyl ureas), poly(vinyl phosphates), poly(vinyl sulfates).

x. Poly(benzobenzimidazoles), poly(oxadizoles), poly(triazoles), poly(benzimidazoles) and the like.

The gas transport film of the invention may be used as a discriminating layer in a gas separation process. In such a process, a gaseous mixture containing at least one first gas and at least one second gas is brought into contact with a feed side of a membrane comprising the gas transport film of the invention. A gas enriched in the first gas is withdrawn from a lower pressure downstream side of the membrane. In such processes, the gas transport film of the invention may be fabricated into, for example, hollow fibers or an accumulation of hollow fibers, one or more polygonal tubes, a spiral wound membrane, pleated or flat sheet, or other high surface area configuration. Multiple films can be assembled into cartridges, modules or other assemblies, as described, for example, in U.S. Pat. No. 7,247,191, incorporated herein by reference.

The gas transport film of the invention may be supported when used as a discriminating layer in gas separation processes. The support provides mechanical strength. It is in general more permeable to gasses than is the applied film, and may be in fact porous or otherwise permeable to liquids. The support may be a hollow fiber or accumulation of hollow fibers, a polygonal tube, spiral wound support, pleated or flat sheet, or other high surface area material. Any of the polymers types a-x described above may be used as support materials, the selection of the polymer type depending on the specific demands of the particular gas separation process. In addition, other materials such as metals, ceramics and the like may be used as support materials.

The gas transport film of the invention is useful for separating, for example, at least one acid gas such as carbon dioxide, hydrogen sulfide and alkyl mercaptans from at least one gaseous alkane or alkene such as natural gas, methane, ethane, ethylene, propane, propylene or butane. The gas transport film is also useful for separating water from at least one gaseous alkane or alkene; water from carbon dioxide; carbon dioxide from flue gas or a nitrogen-rich gas stream; oxygen from air, nitrogen from air, and the like. In such gas separation processes, the gas transport film of the invention preferably exhibits a separation factor of at least 3, more preferably at least 5, with regard to the gasses being separated. Separation factor between any pair of gases is the ratio of the higher of the two permeabilities of the respective pure gases through the gas transport film to the lower of the two permeabilities.

The brominated styrene-butadiene copolymers have been found to have high permeabilities to certain gases, especially water vapor, and therefore are useful by themselves or in blends with other polymers to form liquid barrier films that permit certain trapped gasses, such as water vapor to permeate through the film. Liquid barrier films of these types are useful in a variety of packaging and construction applications. An additional advantage of those films is that they often have excellent flame resistance (as indicated by standardized fire tests).

The gas transport film of the invention is useful, for example, as a packaging film, especially for moisture-sensitive products including electronics, industrial equipment, paper and cardboard products, wood products, manufactured rollstocks such as floor covering products, food packaging, polymer sheet foam or polymer film, and the like. Gas transport films made from blends of the brominated styrene-butadiene copolymer with one or more other polymers as described before can be used in these applications. Blends with polyolefins such as LDPE, HDPE, LLDPE or substantially linear polyethylene; poly(vinyl aromatic) polymers and copolymers such as polystyrene and styrene-acrylic acid copolymers; and/or polyesters such as poly(ethylene terephthalate) and poly(lactic acid) are particularly useful in these applications; such blends preferably contain enough of the brominated styrene-butadiene polymer to provide the blend with a bromine content within a range of from 0.1 percent by weight to 25 percent by weight, based upon blend weight.

Another application of interest is polymer foam insulation backing, especially for foam board insulation products. A layer of a polymer film is often applied to one or more surfaces of polymer foam insulation as a water barrier and to retain low thermal conductivity blowing agents within the polymer foam. The gas transport film of this invention is very suitable for this application. The gas transport film is applied to one or more surfaces of the polymer foam insulation, typically by heat-softening the film until it becomes tacky and laminating the heat-softened film onto the previously-formed polymer foam. It is also possible to affix the film to the foam surface via an adhesive, by heat-softening the foam surface, or even by pouring or extruding the foam onto the film surface. The polymer foam can be any thermally insulating foam, such as a polystyrene or polystyrene copolymer foam, a rigid polyurethane foam, a polyisocyanurate foam, a polyethylene or ethylene copolymer foam, and the like.

Similarly, floor coverings such as carpet, carpet pad, artificial grass and the like are often manufactured with a polymeric water barrier layer, and the gas transport film of the invention is suitable for use as the gas transport layer. The floor covering includes a facing layer, which is the side of the product that is exposed when first installed (although the exposed side may in some cases be subsequently covered). The water barrier layer is applied directly or indirectly (i.e., through one or more intermediate layers) to the reverse side of the facing layer. Lamination or adhesive methods can be used to apply the film.

The gas transport film of the invention also is useful as a protective film for the facing of a floor covering product.

Gas transport films of the invention are also useful as water barrier films in the construction industry. These films are commonly known as "building wrap" or "house wrap" films, and are often used on the walls and/or roofs of frame constructions. In such applications, the gas transport film is applied to a surface of a wall or roof, typically an exterior surface beneath a façade (in the case of walls) or beneath sheathing such as tiles or shingles (in the case of a roof).

A gas transport film used in packaging, polymer foam insulation backing, floor covering applications and building wrap desirably has a water vapor permeability of at least 15 g·mil/m²·day at 37.8° C., while being impermeable to liquid water. Higher water vapor permeabilities are more desirable, such as at least 40 g·mil/(m²·day) at 37.8° C., again while being impermeable to liquid water. The brominated styrene-butadiene copolymer by itself often has a water vapor permeability in the range of 100 to 150 g·mil/m²·day, and therefore can be used alone to produce gas transport films for these applications. The gas transport film for these applications may be a blend of the brominated styrene-butadiene copolymer with one or more other polymers, in which case the blend should have a water vapor permeability of at least 15 g·mil/(m²·day) at 37.8° C. or at least 40 g·mil/(m²·day) at 37.8° C. while being impermeable to liquid water. The other polymer(s) may be in some embodiments a polyolefin such as LDPE, HDPE, LLDPE or substantially linear polyethylene; poly(vinyl aromatic) polymers and copolymers such as polystyrene and styrene-acrylic acid copolymers; and/or polyesters such as poly(ethylene terephthalate) and poly(vinylidene chloride); or a polyamide. In addition to the water-permeability already mentioned, such blends preferably contain enough of the brominated styrene-butadiene polymer to provide the blend with a bromine content within a range of from 0.1 percent by weight to 25 percent by weight, based upon blend weight.

The following examples are provided to illustrate the invention, but not to limit the scope thereof. All parts and percentages are by weight unless otherwise indicated.

EXAMPLES 1-12

Various styrene-butadiene triblock copolymers having a central polybutadiene block are brominated using tetraethylammonium tribromide as the brominating agent, according to the general process described in WO 2008/021417. The starting styrene-butadiene polymers are characterized as follows:

| Starting Copolymer Designation | $M_w$, g/mol | Wt-% styrene | Wt-% butadiene | Mol-% butadiene | 1,2-butadiene content, % |
|---|---|---|---|---|---|
| A | 76,000 | 35 | 65 | 78 | 78 |
| B | 86,000 | 45 | 55 | 70 | 80 |
| C | 96,000 | 44 | 56 | 71 | 82 |
| D | 135,000 | 44 | 56 | 71 | 78 |
| E | 140,000 | 33 | 67 | 80 | 84 |

The brominated copolymers are characterized as follows:

| Brominated Copolymer Designation | Starting Copolymer | % butadiene bromination |
|---|---|---|
| 1 | A | 98 |
| 2 | B | 73 |
| 3 | B | 82 |
| 4 | B | 96 |
| 5 | C | >98 |
| 6 | C | 98 |
| 7 | C | 98 |
| 8 | C | 98 |
| 9 | D | >98 |
| 10 | E | >98 |

In each case, fewer than 10% of the styrene rings are brominated.

Films are made from each of brominated copolymers 1-10 for gas permeation testing. Powdered copolymers are dissolved in toluene to form a 15% by weight solution. The resulting solutions are poured into a polytetrafluoroethylene dish and placed in a 40° C. oven under an air purge for 24-48 hours to remove the solvent and form the film. The remaining film is removed from the dish and dried for 2-4 hours. The thicknesses of the dried films are measured.

The dried films are loaded into a pure gas permeation cell as described in U.S Published Patent Application 2010-0126341 for $CO_2$ and $CH_4$ testing, and exposed to vacuum for 16 hours at 35° C. The samples are then tested to confirm that they have a leak rate of no greater than $2 \times 10^{-6}$ torr/s (266 Pa/s). The samples are then exposed on one side to the test gas at 15 psig (105 KPa) and 35° C. until the rate of pressure increase on the opposite side of the sample reaches a steady state (less than 0.5% change in pressure increase over a period of 10 minutes). Steady state permeation values are then measured. In cases in which the film is evaluated using multiple gases, the spaces upstream and downstream of the film are evacuated using a vacuum pump for at least 16 hours at 35° C.

Water vapor transport is measured using a Mocon Permatran-W® 700 moisture vapor transmission rate testing instrument (MOCON, Inc.) comprising a water sensor. Water vapor transport experiments are conducted at about 37.8° C., 760 mmHg (101 kPa) barometric pressure, and 100% relative humidity. A carrier gas is anhydrous nitrogen gas and the test gas comprises water vapor in air. The test gas is generated from a wet sponge disposed near the entrance face of the plaque. The carrier gas sweeps any water vapor that permeates through the film away from the exit face of the film to the sensor.

Results are as indicated in Table 1.

TABLE 1

| Brominated copolymer | Permeability (barrer) at 15 psig (105 kPa) feed | | | Separation Factor, $CO_2/CH_4$ | Water permeability, $g \cdot mil/(m^2 \cdot day)$ |
|---|---|---|---|---|---|
| | $CO_2$ | $N_2$ | $CH_4$ | | |
| 1 | 45.3 | 27.7 | 8.8 | 5.15 | ND |
| 2 | 78.3 | 9.18 | 21.2 | 3.69 | ND |
| 3 | 70.5 | 9.14 | 22.9 | 3.08 | ND |
| 4 | 97.3 | ND | 30.3 | 3.21 | 138.4 |
| 5 | 25.6 | ND | ND | — | ND |
| 6 | 27.0 | ND | ND | — | ND |
| 7 | 28.4 | ND | ND | — | ND |
| 8 | 32.6 | ND | ND | — | ND |
| 9 | 40.7 | ND | ND | — | ND |
| 10 | 156.3 | 7.11 | ND | — | 148.3 |

What is claimed is:

1. A method for making a gas transport film comprising a brominated styrene-butadiene copolymer, comprising brominating a starting styrene-butadiene copolymer having styrene units and 60 to 90 mole-% butadiene units to brominate at least 70 mol-% of the butadiene units and no more than 10% of the aromatic rings of the styrene units and then forming the brominated styrene-butadiene copolymer into a supported or free-standing film, the film having a thickness of 10 nanometers of 5 micrometers if supported or 0.025 to 0.5 mm if free-standing.

2. The method of claim 1 wherein the brominated styrene-butadiene copolymer is a block copolymer of styrene and butadiene having an apparent molecular weight, as measured by gel permeation chromatography against a polystyrene standard, of from 50,000 to 200,000.

3. The method of claim 2 wherein at least 85% of the butadiene units in the starting styrene-butadiene copolymer are 1,2-butadiene units.

4. The method of claim 1, wherein the brominated styrene-butadiene copolymer is made by brominating a solution of a starting styrene-butadiene copolymer with a quaternary ammonium tribromide or quaternary phosphonium tribromide.

5. A gas transport film made in accordance with the method of claim 1.

6. The gas transport film of claim 5 wherein the brominated styrene-butadiene copolymer is present in the film as a blend with at least one additional organic polymer.

7. The gas transport film of claim 6, wherein the blend contains an amount of the brominated styrene-butadiene copolymer to provide the blend with a bromine content from 0.1 to 25 percent by weight.

8. The gas transport film of claim 7 wherein the additional organic polymer is selected from LDPE, HDPE, LLDPE, substantially linear polyethylene; polystyrene, a styrene-acrylic acid copolymer; polyvinylidene chloride, or poly(ethylene terephthalate).

9. The gas transport film of claim 5, which has a water vapor permeability of at least 15 $g \cdot mil/m^2 \cdot day$ at 37.8° C. and is impermeable to liquid water.

10. A polymer foam thermal insulation product having a gas transport film of claim 5 attached to at least one surface thereof.

11. A floor covering product having a facing layer and at least one layer of the gas transport film layer of claim 5 attached directly or indirectly to a reverse side of the facing layer.

12. A building construction comprising at least one wall or roof structure having a layer of the gas transport film of claim 5 applied to a major surface thereof.

13. A method for separating gases, comprising contacting a gaseous mixture containing at least one first gas and at least one second gas with a feed side of a membrane comprising the gas transport film of claim 5 and withdrawing a gas enriched in the first gas from a lower pressure downstream side of the membrane.

14. A method for separating an acid gas from a gaseous alkane or alkene, comprising contacting a gaseous mixture of at least one acid gas and at least one gaseous alkane or alkene with a feed side of a membrane comprising the gas transport film of claim 5, and withdrawing a gas enriched in the acid gas from a lower pressure downstream side of the membrane.

* * * * *